United States Patent Office 3,454,634
Patented July 8, 1969

3,454,634
PROCESS FOR PREPARING DIPHENYLPHOSPHO-NITRILE TRIMER AND TETRAMER
David L. Herring and Catherine M. Douglas, Riverside, Calif., assignors to the United States of America as represented by the Secretary of the Navy
No Drawing. Filed Nov. 21, 1963, Ser. No. 325,514
Int. Cl. C07d *119/00, 105/02*
U.S. Cl. 260—551    1 Claim

ABSTRACT OF THE DISCLOSURE

Preparation of cyclic phosphonitrilic ring systems which have groups capable of further reaction and groups capable of further reaction and groups providing thermal stability to the molecule, wherein position of the groups on the ring can be accurately predicted from the synthesis employed.

---

The invention herein described may be manufactured and used by or for the Government of the United States of America for government purposes without the payment of any royalties thereon or therefor.

The purpose of the invention disclosed herein is to provide a general method for the preparation of cyclic phosphonitriles. These materials are useful intermediates used in the synthesis of new and useful thermally stable polymeric materials, such as insulating materials and hydraulic fluids. More particularly this invention provides a process for the preparation of heterosubstituted, cyclic phosphonitriles.

This application relates to copending U.S. patent application Ser. No. 325,515, filed Nov. 21, 1963, entitled Heterosubstituted Phosphonitriles.

Diphenyl substituted cyclic phosphonitriles prepared by the process disclosed herein are well known as shown by U.S. Patent No. 2,853,517 issued Sept. 23, 1958 to Fitzgerald et al. who prepared same by a different process. Also, French Patent No. 1,270,800 issued Jan. 8, 1962 to General Dynamics Corporation discloses the use of cyclic phosphonitriles as intermediates in the preparation of thermally stable compounds used as insulative coatings.

The classic methods for the preparation of cyclic phosphonitriles containing organic substituents are:

$$R_2PCl_3 + NH_3 \text{ (or } NH_4Cl) \rightarrow [R_2PN]_x \quad (1)$$

where $R = CH_3, C_2H_5, C_6H_5$, or substitution on the existing phosphonitrilic ring system:

$$(PNCl_2)_x + C_6H_5MgBr \rightarrow [(C_6H_5)_2PN]_x \quad (2)$$

or $$C_6H_6 + AlCl_3$$

where $x$ is 3 or 4.

In the example shown in Equation 2, the chlorine atoms are substituted by the phenyl groups in a geminal fashion; thus the compounds: $(C_6H_5)_2Cl_4P_3N_3$;

$$(C_6H_5)_4Cl_2P_3N_3$$

$(C_6H_5)_4Cl_4P_4N_4$ result. References: H. Bode and R. Thamer, Ber 76B, 121–7 (1943); H. Bode and H. Bach, Ber. 75B, 215 (1942). The procedures described above are limited inasmuch as they offer products which are either fully substituted by organic groups thus making the molecules unavailable for further polymerization reactions; or substituted by more than two halide groups which would make further reactions very complex and give undesirable products.

It is an object of the invention to provide a method for the preparation of cyclic phosphonitriles.

Another object of the invention is to provide a process for the preparation of heterosubstituted, cyclic phosphonitriles.

Still another object of the invention is to provide a synthesis for tetrachlorotetraphenyl phosphonitrile.

A further object of the invention is to provide a method for preparing intermediates used in the synthesis of thermally stable polymeric materials.

Other objects and many of the attendant advantages of this invention will become readily appreciated as the same becomes better understood by reference to the following detailed description.

The process of the present invention described herein employs as a starting material, a compound which may be represented by the following structure:

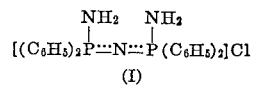
(I)

Compound I is well-known and has been reported by several investigators: V. V. Korshak, I. A. Gribova, T. V. Artamonova and A. N. Bushmarina, Vysokomal. Soedineniya 2, 377 (1960); and I. I. Bezman and J. H. Smalley, Chem. and Ind. (London), 839 (1960).

The present invention comprises the following procedure: When compound I is heated with pentavalent phosphorus halides, such as $R_2PCl_3$ when R is alkyl, aryl or halogen, a ring closure reaction occurs, yielding both trimeric and tetrameric cyclic phosphonitriles, and eliminating HCl. Trimer formation may be shown as:

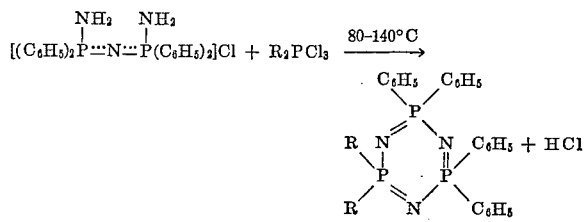

Tetramer formation proceeds as follows:

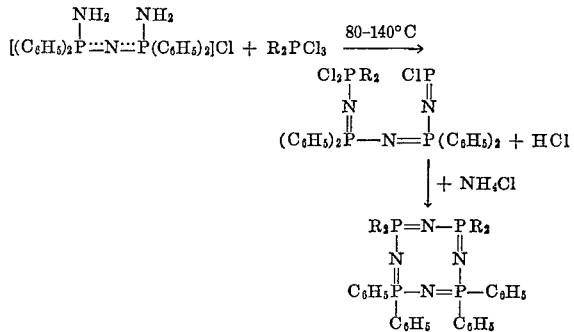

The procedure is illustrated by the following experimental details:

A mixture of 9.0 g. (0.02 mole) of compound I and 4.2 g. (0.02 mole) of freshly sublimed $PCl_5$ was heated under vacuum at 80–140° C. for sixteen hours when the evolution of HCl, which had been vigorous initially, became negligible. The reaction mixture was then cooled, opened to the air and extracted with boiling benzene. The benzene solution was then concentrated to near dryness and boiling ligroin was added. On cooling a white crystalline material was recovered which was identified as $(C_6H_5)_4Cl_2P_3N_3$, M.P. 142–143° C., 65% yield.

Calc. for $C_{24}H_{20}Cl_2P_3N_3$: C, 56.1; H, 3.9; Cl, 13.8; P, 18.1; N, 8.2; mol. wt. 513. Found: C, 56.2; H, 4.0; Cl, 13.8; P, 18.2; N, 8.3; mol. wt. 509 (cryoscopically in benzene).

The remaining benzene-ligroin solution was concentrated and upon standing, a white crystalline material precipitated. Recrystallization of this material from acetonitrile yielded tetrachlorotetraphenyl phosphonitrile tetramer (6%), M.P. 135° (sealed tube).

Analysis.—Calcd. for $C_{24}H_{20}Cl_4P_4N_4$: C, 45.8; H, 3.2; P, 19.7; H, 8.9; Cl, 22.3; mol. wt. 630. Found: C, 46.1; H, 3.3; P, 19.7; H, 8.7; Cl, 22.4; mol. wt. 615 (cryoscopically in bromoform).

A mixture of 10.2 g. (0.002 mole) of compound I and 5.2 g. (0.02 mole) of $C_6H_5PCl_4$ was introduced into a heavy wall glass ampoule and on the vacuum line was heated gradually over the course of 16 hours from 135–140° C. The resulting mixture was then extracted with ethyl ether. By fractional crystallization two products were isolated which were identified as isomeric forms of the structure:

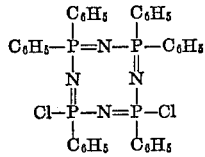

One isomer had a melting point 192–193° C.

Calc. for $C_{36}H_{30}Cl_2P_4N_4$: C, 60.7; H, 4.2; Cl, 9.9; P, 17.4; N, 7.8; mol. wt. 713. Found: C, 60.7; H, 4.2; Cl, 9.7; P, 17.4; N, 8.0; mol. wt. 695 (cryoscopically in benzene).

The second isomer melted at 157–158° C.

Calc. for $C_{36}H_{30}Cl_2P_4N_4$: C, 60.7; H, 4.2; Cl, 9.9; P, 17.4; N, 7.8; mol. wt. 713. Found: C, 60.9; H, 4.4; Cl, 9.7; P, 17.4; N, 7.9; mol. wt. 690.

The ether solution was further concentrated and the material recovered therefrom was recrystallized from ligroin to yield $C_6H_5ClP_3N_3$, M.P. 150–151° C.

Calc. for $C_{30}H_{25}P_3N_3Cl$: C, 65.0; H, 4.5; P, 16.7; N, 7.6; Cl, 6.3; mol. wt. 556. Found: C, 64.7; H, 4.7; P, 16.7; N, 7.7; Cl, 6.2; mol. wt. 536 (cryoscopically in benzene).

The reaction of compound I with $(C_6H_5)_2PCl_3$ carried out in a manner similar to those outlined above gave a 40% yield of $[(C_6H_5)_2PN]_3$.

The advantages of the method as set forth above are the preparation of cyclic phosphonitrilic ring systems which have as substituents, groups capable of further reaction (i.e. chlorine atoms) as well as groups which provide thermal stability to the molecule (i.e. phenyl groups). The position of the groups on the ring can be accurately predicted from the synthetic method employed, and no other one-step method is currently available which yields such heterosubstituted rings.

Obviously many modifications and variations of the present invention are possible in the light of the above teachings. It is therefore to be understood that within the scope of the appended claims the invention may be practiced otherwise than as specifically described.

What is claimed is:

1. A method for the synthesis of diphenyl phosphonitrile trimer and diphenyl phosphonitrile tetramer which comprises reacting $$[(C_6H_5)_2P(NH_2)NP(NH_2)(C_6H_5)_2]Cl$$

with diphenyltrichlorophosphorane in vacuo at a temperature range of 80–140° C. until evolution of hydrogen chloride ceases, followed by recovery of diphenyl phosphonitrile tetramer and subsequent recovery of diphenyl phosphonitrile trimer by fractional recrystallization.

References Cited

UNITED STATES PATENTS

| | | |
|---|---|---|
| 2,853,517 | 9/1958 | Fitzgerald et al. |
| 3,230,252 | 1/1966 | Bezman et al. |
| 3,234,273 | 2/1966 | Rice et al. |
| 3,329,716 | 7/1967 | Grushkin et al. |

FOREIGN PATENTS 1,270,800   1961   France.

OTHER REFERENCES

Bode et al.: Berichte, vol. 76, pp. 121–127 (part. p. 122) (1943).

Haber et al.: J. Am. Chem. Soc., vol. 80, pp. 2116–2117 (1958).

Schmulbach et al.: J. Inorg. Nucl. Chem., vol. 25, pp. 1395–1396, November 1963.

Shaw et al.: Chem. Rev., December 1962, pp. 256–258.

LORRAINE A. WEINBERGER, *Primary Examiner.*

HAROLD C. WEGNER, *Assistant Examiner.*

U.S. Cl. X.R.

260—543